United States Patent
Poppe et al.

(10) Patent No.: US 10,294,389 B2
(45) Date of Patent: May 21, 2019

(54) USE OF PHOSPHONIC ACID DIESTERS AND DIPHOSPHONIC ACID DIESTERS AND THERMALLY CURABLE MIXTURES CONTAINING PHOSPHONIC ACID DIESTERS AND DIPHOSPHONIC ACID DIESTERS

(75) Inventors: Andreas Poppe, Sendenhorst (DE); Elke Westhoff, Steinfurt (DE); Beate Gebauer, Münster (DE); Peter Mayenfels, Münster (DE)

(73) Assignee: BASF COATINGS GmbH, Muenster (DE)

( * ) Notice: Subject to any disclaimer, the term of this patent is extended or adjusted under 35 U.S.C. 154(b) by 20 days.

(21) Appl. No.: 12/067,673

(22) PCT Filed: Sep. 21, 2006

(86) PCT No.: PCT/EP2006/009177
§ 371 (c)(1),
(2), (4) Date: Mar. 21, 2008

(87) PCT Pub. No.: WO2007/033826
PCT Pub. Date: Mar. 29, 2007

(65) Prior Publication Data
US 2008/0245998 A1    Oct. 9, 2008

(30) Foreign Application Priority Data
Sep. 22, 2005   (DE) .................. 10 2005 045 150

(51) Int. Cl.
| | | |
|---|---|---|
| C08G 18/00 | (2006.01) | |
| C09D 175/04 | (2006.01) | |
| C08G 18/80 | (2006.01) | |
| C08G 18/38 | (2006.01) | |
| C08G 18/79 | (2006.01) | |
| C08G 18/28 | (2006.01) | |
| C08G 18/42 | (2006.01) | |
| C08L 67/00 | (2006.01) | |
| C09D 167/00 | (2006.01) | |
| C08K 5/524 | (2006.01) | |
| C08K 5/527 | (2006.01) | |
| C08L 61/00 | (2006.01) | |

(52) U.S. Cl.
CPC ......... *C09D 175/04* (2013.01); *C08G 18/289* (2013.01); *C08G 18/388* (2013.01); *C08G 18/3878* (2013.01); *C08G 18/3882* (2013.01); *C08G 18/42* (2013.01); *C08G 18/792* (2013.01); *C08G 18/809* (2013.01); *C08L 67/00* (2013.01); *C09D 167/00* (2013.01); *C08K 5/524* (2013.01); *C08K 5/527* (2013.01); *C08L 61/00* (2013.01)

(58) Field of Classification Search
CPC .............. C08G 18/3878; C08G 18/388; C08G 18/3882; C08G 18/289; C08G 18/3254; C08G 18/792; C08G 18/809; C08G 18/3251; C09D 175/04
USPC ............ 524/590; 252/183.11, 182.2, 182.23, 252/182.29, 182.3, 182.35; 528/48, 51, 528/85
See application file for complete search history.

(56) References Cited

U.S. PATENT DOCUMENTS

| | | | | |
|---|---|---|---|---|
| 3,251,785 | A * | 5/1966 | Anderson | 521/107 |
| 3,525,705 | A * | 8/1970 | Lichtenberg | 521/169 |
| 3,542,718 | A * | 11/1970 | Brizgys et al. | 524/769 |
| 3,746,572 | A * | 7/1973 | Weil et al. | 42/142 |
| 4,419,513 | A | 12/1983 | Breidenbach et al. | |
| 4,454,317 | A | 6/1984 | Disteldorf et al. | |
| 4,547,397 | A | 10/1985 | Burzynski et al. | |
| 4,631,142 | A * | 12/1986 | Sturtz | 252/184 |
| 4,801,675 | A | 1/1989 | Pedain et al. | |
| 5,258,482 | A | 11/1993 | Jacobs et al. | |
| 5,290,902 | A | 3/1994 | Jacobs et al. | |
| 5,679,804 | A * | 10/1997 | Ditrich et al. | 549/221 |
| 5,728,779 | A * | 3/1998 | van de Werff et al. | 525/438 |
| 5,817,732 | A * | 10/1998 | Asahina | C08G 18/3834 524/710 |
| 6,111,002 | A | 8/2000 | Doring et al. | |
| 6,309,710 | B1 * | 10/2001 | Sapper | 427/407.1 |

(Continued)

FOREIGN PATENT DOCUMENTS

| | | |
|---|---|---|
| CA | 2163591 A1 | 6/1996 |
| DE | 2559259 A1 | 7/1977 |

(Continued)

OTHER PUBLICATIONS

International Search Report dated Nov. 24, 2006, International Application No. PCT/EP2006/009177.

(Continued)

*Primary Examiner* — Michael L Leonard
(74) *Attorney, Agent, or Firm* — Oblon, McClelland, Maier & Neustadt, L.L.P.

(57) ABSTRACT

Disclosed herein is a thermally curable mixture, comprising at least one phosphonic diester (A), at least one diphosphonic diester (A), or at least one phosphonic diester and at least one diphosphonic diester (A); and at least one compound (B) which can be reacted by transesterification, transamidation, self-condensation of N-hydroxyalkylamino groups, self-condensation of N-alkoxyalkylamino groups, transacctalization of N-alkoxyalkylamino groups, acctalization of N-hydroxyalkylamino groups, or a combination thereof. Also disclosed is a process for making the thermally curable mixture, and a cured material comprising the product of thermally curing the mixture.

28 Claims, No Drawings

(56) References Cited

U.S. PATENT DOCUMENTS

| | | | |
|---|---|---|---|
| 6,392,006 B1* | 5/2002 | Van Benthem et al. | 528/291 |
| 7,078,474 B2* | 7/2006 | Hermann et al. | 528/45 |
| 8,013,099 B2 | 9/2011 | Poppe et al. | |
| 8,138,249 B2 | 3/2012 | Taniguchi et al. | |
| 2003/0134929 A1* | 7/2003 | Blum | C08G 18/8175 522/116 |
| 2003/0176537 A1* | 9/2003 | Chaiko | 523/200 |
| 2004/0077801 A1* | 4/2004 | Feola et al. | 525/523 |
| 2005/0074617 A1 | 4/2005 | Lin et al. | |
| 2006/0009606 A1 | 1/2006 | Hermann et al. | |
| 2006/0122075 A1* | 6/2006 | Anderson | C08G 18/2875 508/221 |
| 2006/0156960 A1* | 7/2006 | Wombacher et al. | 106/724 |
| 2008/0245998 A1 | 10/2008 | Poppe et al. | |
| 2008/0245999 A1* | 10/2008 | Poppe et al. | 252/183.11 |
| 2009/0223631 A1 | 9/2009 | Poppe et al. | |
| 2010/0015344 A1* | 1/2010 | Groenewolt et al. | 427/407.1 |

FOREIGN PATENT DOCUMENTS

| | | | | |
|---|---|---|---|---|
| DE | 2809588 | A1 | 11/1978 | |
| DE | 4015155 | A1 | 11/1991 | |
| DE | 4024204 | A1 | 2/1992 | |
| DE | 4229183 | A1 | 3/1994 | |
| DE | 4344063 | C1 | 6/1995 | |
| DE | 19650478 | A1 | 6/1998 | |
| DE | 19828935 | A1 | 12/1999 | |
| DE | 19924170 | A1 | 11/2000 | |
| DE | 19938758 | A1 | 2/2001 | |
| DE | 19948004 | A1 | 7/2001 | |
| DE | 10051485 | A1 | 4/2002 | |
| DE | 10132654 | A1 | 10/2002 | |
| DE | 10202819 | C1 | 8/2003 | |
| DE | 102004060966 | A1 | 6/2006 | |
| DE | 102005045228 | A1 | 4/2007 | |
| EP | 0267689 | A2 | 5/1988 | |
| EP | 0183976 | B1 | 6/1988 | |
| EP | 0646608 | B1 | 4/1991 | |
| EP | 0303150 | B1 | 5/1992 | |
| EP | 0531820 | A1 | 3/1993 | |
| EP | 0566037 | A2 | 10/1993 | |
| EP | 0649806 | A1 | 4/1995 | |
| EP | 0496208 | B1 | 10/1996 | |
| EP | 0524500 | B1 | 11/1996 | |
| EP | 0882748 | A2 | 12/1998 | |
| EP | 0976723 | A2 | 2/2000 | |
| EP | 1134266 | | 3/2000 | |
| EP | 1193278 | A1 | 8/2001 | |
| EP | 1134266 | A1 | 9/2001 | |
| EP | 1195397 | A1 | 4/2002 | |
| EP | 1475360 | | 5/2003 | |
| JP | 62260868 | A | 11/1987 | |
| JP | H01188571 | A | 7/1989 | |
| JP | H0858013 | A | 3/1996 | |
| JP | H11507399 | A | 6/1999 | |
| JP | 2000103959 | A * | 4/2000 | C08L 75/04 |
| JP | 2001262082 | A | 9/2001 | |
| JP | 2002179688 | A | 6/2002 | |
| WO | WO 9916810 | A1 * | 4/1999 | C08G 69/44 |
| WO | WO00/31194 | A1 | 6/2000 | |
| WO | WO00/37520 | A1 | 6/2000 | |
| WO | 0055270 | | 9/2000 | |
| WO | WO00/64763 | A1 | 11/2000 | |
| WO | WO01/009231 | A1 | 2/2001 | |
| WO | WO01/009259 | A1 | 2/2001 | |
| WO | WO01/09260 | A1 | 2/2001 | |
| WO | WO01/09261 | A1 | 2/2001 | |
| WO | WO03011992 | A2 | 2/2003 | |
| WO | WO2004072189 | A2 | 8/2004 | |
| WO | WO2005105938 | A1 | 11/2005 | |
| WO | WO2007033786 | A1 | 3/2007 | |
| WO | WO2007033826 | A1 | 3/2007 | |

OTHER PUBLICATIONS

Written Opinion of International Searching Authority dated Nov. 24, 2006, International Application No. PCT/EP2006/009177.
CAS Registry file search for Dimethyl Methylphosphonate.
CAS Registry file search for Diphosphonic acid.
Hohenesche et al., Journal of Chromatography A, 1025 (2004) 177-187.
International Preliminary Report dated Jan. 20, 2009 for International Application No. PCT/EP2007/000660.
International Preliminary Report dated Apr. 8, 2008 for International Application No. PCT/EP2006/008908.
International Search Report for International Application No. PCT/EP2008/002291 dated Jul. 1, 2008.
International Search Report dated Sep. 13, 2006 for International Application No. PCT/EP2006/008908.
International Preliminary Report on Patentability dated Sep. 29, 2009 for International Application No. PCT/EP2008/002291.
International Search Report for International Application No. PCT/EP2007/000660 dated Oct. 25, 2007.
CAS Registry file search for Neopentyl Methylphosphonate.
CAS Registry file search for Phosphonic acid.
Written Opinion for International Application No. PCT/RP2007/000660 filed Jan. 26, 2007.
Written opinion for International Application No. PCT/EP2008/02291 filed on Mar. 20, 2008.
Written Opinion for International Application No. PCT/EP2006/008908 dated Sep. 13, 2006.
Co-Pending U.S. Appl. No. 12/302,534 with 371(c) date of May 14, 2009 published as US20090223631A1.
International Preliminary Report on Patentability for International Application No. PCT/EP2006/009177 dated Apr. 8, 2008.

* cited by examiner

USE OF PHOSPHONIC ACID DIESTERS AND DIPHOSPHONIC ACID DIESTERS AND THERMALLY CURABLE MIXTURES CONTAINING PHOSPHONIC ACID DIESTERS AND DIPHOSPHONIC ACID DIESTERS

CROSS REFERENCE TO RELATED APPLICATIONS

This application is a National Phase Application of International Patent Application PCT/EP2006/009177, filed on Sep. 21, 2006, which claims priority to German patent application DE 10 2005 045 150.0, filed on Sep. 22, 2005.

FIELD OF THE INVENTION

The present invention relates to the new use of phosphonic diesters and diphosphonic diesters as reactants and/or catalysts. The present invention also relates to new, curable mixtures comprising phosphonic diesters and diphosphonic diesters as reactants and/or catalysts.

BACKGROUND

Phosphonic diesters are esters of phosphonic acid [HP(O)(OH)$_2$], which is tautomeric with phosphorous acid [P(OH)$_3$]. The phosphonic diesters are frequently also referred to, not entirely correctly, as secondary phosphites. However, the true derivatives of phosphorous acid are only the triesters.

Diphosphonic diesters are the diesters of diphosphonic acid:

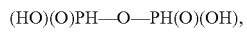

(HO)(O)PH—O—PH(O)(OH), formerly also referred to as diphosphorous acid.

(Cf. in this regard Römpp Lexikon der Chemie, Georg Thieme Verlag, Stuttgart, N.Y., 1990, "Phosphites", "Phosphonates", "Phosphonic acid", "Diethyl phosphite", and "Dimethyl phosphite".)

Thermally curable mixtures, especially coating materials, which comprise polyols, amino resins, and polyisocyanates are known from European patent EP 1 171 356 B1 or from international patent applications WO 01/09261, WO 01/09260, WO 01/09259 or WO 01/09231. The catalyst used for the thermal crosslinking is an alcoholic solution of acidic phenyl phosphate ("phenyl acid phosphate") in alcoholic solution. Shortly before being used, the thermally curable mixtures are prepared from multicomponent systems, especially two-component systems, in which one component comprises the polyols and the amino resins and another component comprises the polyisocyanates.

The known thermally curable mixtures, particularly the coating materials, give coatings which are hard, abrasion-resistant, scratch-resistant, and etch-resistant and which also, as clearcoats, are of high gloss and clarity.

The known thermally curable mixtures, however, have drawbacks.

Thus, owing to the high reactivity of the polyisocyanates toward alcohols, the alcoholic solutions of the acidic phenyl phosphate cannot be added to the component in question, which imposes a restriction on the degrees of process freedom. In other words, the catalyst must always be added to the polyol and amino resin component, an action which, however, may raise the reactivity of that component so greatly as to be detrimental to its stability in storage.

Moreover, the known thermally curable mixtures have a potlife which frequently proves in practice to be too short, resulting in technical and logistical problems in the painting operation. This can lead not least to unacceptable painting results.

There is therefore a need to further improve the crosslinking of thermally curable mixtures comprising polyols, amino resins, and polyisocyanates.

The mechanisms of thermal crosslinking in these mixtures, though, are complex, hindering targeted ongoing development. For instance, in the case of thermal crosslinking, there occurs in such mixtures, in particular, a reaction of the polyisocyanates with the methanol released from the amino resins, and not a reaction with the polyols.

It is therefore necessary to use blocked polyisocyanates in order to obtain a three-dimensional network which is composed of all three building blocks and unites the advantages of networks composed of polyol and polyisocyanate and also networks composed of polyol and amino resin (cf. the article by E. S. Ntsihlele and A. Pizzi, »Crosslinked Coatings by Co-Reaction of Isocyanate-Methoxymethyl Melamine Systems«, Journal of Applied Polymer Science, Volume 55, pages 153 to 161, 1995). Crosslinking with blocked polyisocyanates, however, proceeds only at relatively high temperatures, usually above 100° C. As a consequence the corresponding thermally curable mixtures can no longer be used as refinishes which begin crosslinking even at room temperature.

A further way of obtaining a three-dimensional network composed of all three building blocks is to use what are called "high imino" melamine resins, which have a particularly high reactivity. These resins, however, have comparatively high molecular weights, which deleteriously raises the viscosity of the thermally curable mixtures in question. Furthermore, depending on the catalyst employed, they have a comparatively high tendency to crosslink with themselves, which is highly detrimental to the stability in storage, in particular.

From European patent application EP 0 976 723 A2 it is known to catalyze the reaction of cycloaliphatic polyisocyanates with polyols to polyurethanes by means of dimethyl phosphite, diethyl phosphite or diphenyl phosphite. In addition to these, a multiplicity of other catalysts come into consideration.

European patent application EP 1 134 266 A1 discloses thermally curable powder coating materials which comprise carboxyl-containing binders, compounds containing hydroxyalkylamide groups, aromatic amines (light stabilizers), and diphenyl phosphite or diisooctyl phosphite. Besides these two phosphites, a multiplicity of triesters of phosphorous acid come into consideration. They are used as antioxidants.

SUMMARY

The present invention is based on the object of finding a new use of phosphonic diesters and diphosphonic diesters and thus broadening their usefulness in order to enrich the art.

The present invention is also based on the object of finding new thermally curable mixtures comprising phosphonic diesters and/or diphosphonic diesters.

The present invention is further based on the object of finding new reactants and/or catalysts for compounds (B) which can be reacted by transesterification, transamidation, self-condensation of N-hydroxyalkylamino groups and/or N-alkoxyalkylamino groups, transacetalization of N-alkoxyalkylamino groups and/or acetalization of N-hydroxyalkylamino groups.

The present invention is additionally based on the object of finding new thermally curable mixtures which are curable by transesterification, transamidation, self-condensation of N-hydroxyalkylamino groups and/or N-alkoxyalkylamino groups, transacetalization of N-alkoxyalkylamino groups and/or acetalization of N-hydroxyalkylamino groups.

The new thermally curable mixtures ought to be stable in storage and yet exhibit a high reactivity on thermal curing.

In the course of thermal curing the transesterification, transamidation, self-condensation of N-hydroxyalkylamino groups and/or N-alkoxyalkylamino groups, transacetalization of N-alkoxyalkylamino groups and/or acetalization of N-hydroxyalkylamino groups ought to proceed reliably, without problems, and with very good reproducibility even in the presence of polyisocyanates.

At the same time the thermally curable mixtures comprising polyisocyanates ought to have a practical potlife or processing life. Moreover, at least both the compounds (B), particularly the amino resins (B), and the polyisocyanates ought to be incorporated into the three-dimensional network which forms in the course of curing.

The present invention is further based on the object of providing new reactants and/or catalysts for thermally curable mixtures, especially thermally curable coating materials, which are prepared from two-component or multicomponent systems, especially two-component systems, which comprise a component (I) comprising at least one compound (B) and a component (II) comprising polyisocyanates. The catalysts and/or reactants ought to be able to be present both in component (I) and in component (II) without detriment to the stability in storage of, in particular, component (II). The intention thereby is to significantly increase the number of degrees of process freedom in the preparation and use of the thermally curable mixtures.

The object of the present invention not least is to provide new thermally curable mixtures, especially thermally curable coating materials, which give thermally cured materials, particularly coatings, which are particularly hard, abrasion-resistant, scratch-resistant, and etch-resistant and which also, as clearcoats, are of particularly high gloss and clarity.

Found accordingly has been the new use of phosphonic diesters and diphosphonic diesters (A) as reactants of and/or catalysts for compounds (B) which can be reacted by transesterification, transamidation, self-condensation of N-hydroxyalkylamino groups and/or N-alkoxyalkylamino groups, transacetalization of N-alkoxyalkylamino groups and/or acetalization of N-hydroxyalkylamino groups, which is referred to below as "inventive use".

Also found have been the new thermally curable mixtures which are curable by transesterification, transamidation, self-condensation of N-hydroxyalkylamino groups and/or N-alkoxyalkylamino groups, transacetalization of N-alkoxyalkylamino groups and/or acetalization of N-hydroxyalkylamino groups and comprise at least one phosphonic diester and/or at least one diphosphonic diester (A), and which are referred to below as "mixtures of the invention".

Found not least has been the new process for preparing the mixtures of the invention, which involves mixing at least one compound (B) and at least one phosphonic diester and/or at least one diphosphonic diester (A) with one another and homogenizing the resulting mixture, this being referred to below as "process of the invention".

Additional subject matter of the invention will become apparent from the description.

DETAILED DESCRIPTION

In the light of the prior art it was surprising and unforeseeable for the skilled worker that the object on which the present invention was based could be achieved by means of the inventive use, the mixtures of the invention, and the process of the invention.

In particular it was surprising that the inventive use extraordinarily broadened the application possibilities of phosphonic diesters and diphosphonic diesters (A), thereby enriching the art extraordinarily.

In addition it was surprising that the phosphonic diesters and/or diphosphonic diesters (A) were outstanding reactants of and/or catalysts for compounds (B) which could be reacted by transesterification, transamidation, self-condensation of N-hydroxyalkylamino groups and/or N-alkoxyalkylamino groups, transacetalization of N-alkoxyalkylamino groups and/or acetalization of N-hydroxyalkylamino groups.

It was also surprising that by virtue of the inventive use it was possible to provide the mixtures of the invention which were curable by transesterification, transamidation, self-condensation of N-hydroxyalkylamino groups and/or N-alkoxyalkylamino groups, transacetalization of N-alkoxyalkylamino groups and/or acetalization of N-hydroxyalkylamino groups and exhibited outstanding performance properties.

In particular the mixtures of the invention were stable in storage and yet exhibited high reactivity on thermal curing.

In the course of the thermal curing of the mixtures of the invention the transesterification, transamidation, self-condensation of N-hydroxyalkylamino groups and/or N-alkoxyalkylamino groups, transacetalization of N-alkoxyalkylamino groups and/or acetalization of N-hydroxyalkylamino groups proceeded reliably, without problems, and with very good reproducibility even in the presence of polyisocyanates.

At the same time the mixtures of the invention comprising polyisocyanates exhibited a practical potlife or processing life. Moreover, at least both the compounds (B), particularly the amino resins (B), and the polyisocyanates (C) were incorporated into the three-dimensional network which formed in the course of curing.

It was possible not least to prepare the mixtures of the invention, especially the coating materials of the invention, from two-component or multicomponent systems, especially two-component systems, which comprised a component (I) comprising at least one compound (B) and a component (II) comprising polyisocyanates. It was possible for the catalysts and/or reactants to be present both in component (I) and in component (II) without detriment to the stability in storage of component (II) in particular. As a result it was possible to achieve a significant increase in the number of degrees of process freedom in the preparation and use of the mixtures of the invention.

Surprising not least was the fact that the mixtures of the invention gave new thermally cured materials, particularly new coatings, which were particularly hard, abrasion-resistant, scratch-resistant, and etch-resistant and which also, as clearcoats, were of particularly high gloss and clarity.

In accordance with the invention the phosphonic diesters and/or diphosphonic diesters (A) are used as reactants and/or catalysts for compounds (B) which can be reacted by transesterification, transamidation, self-condensation of N-hydroxyalkylamino groups and/or N-alkoxyalkylamino groups, transacetalization of N-alkoxyalkylamino groups and/or acetalization of N-hydroxyalkylamino groups.

For the inventive use the phosphonic diesters and diphosphonic diesters (A) are selected preferably from the group consisting of acyclic phosphonic diesters, cyclic phosphonic diesters, acyclic diphosphonic diesters, and cyclic diphosphonic diesters.

The acyclic phosphonic diesters (A) are preferably selected from the group consisting of acyclic phosphonic diesters (A) of the general formula I:

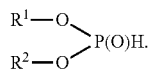
(I)

In the general formula I the radicals $R^1$ and $R^2$ are identical or different from one another; preferably they are identical.

The radicals $R^1$ and $R^2$ are selected from the group consisting of:
- substituted and unsubstituted alkyl- having 1 to 20, preferably 2 to 16, and in particular 2 to 10 carbon atoms, cycloalkyl- having 3 to 20, preferably 3 to 16, and in particular 3 to 10 carbon atoms, and aryl- having 5 to 20, preferably 6 to 14, and in particular 6 to 10 carbon atoms, the hyphen symbolizing in each case the covalent bond between a carbon atom of the radical $R^1$ or $R^2$ and the oxygen atom of the O—P group;
- substituted and unsubstituted alkylaryl-, arylalkyl-, alkylcycloalkyl-, cycloalkylalkyl-, arylcycloalkyl-, cycloalkylaryl-, alkylcycloalkylaryl-, alkylarylcycloalkyl-, arylcycloalkylalkyl-, arylalkylcycloalkyl-, cycloalkylalkylaryl-, and cycloalkylarylalkyl-, the alkyl, cycloalkyl-, and aryl groups therein each containing the above-recited number of carbon atoms and the hyphen symbolizing in each case the covalent bond between a carbon atom of the radical $R^1$ and $R^2$ and the oxygen atom of the O—P group; and
- substituted and unsubstituted radical- of the above-recited kind, containing at least one, in particular one heteroatom selected from the group consisting of oxygen atom, sulfur atom, nitrogen atom, phosphorus atom, and silicon atom, in particular oxygen atom, sulfur atom, and nitrogen atom, the hyphen symbolizing the covalent bond between a carbon atom of the radical and the oxygen atom of the O—P group.

The cyclic phosphonic diesters (A) are preferably selected from the group consisting of the cyclic phosphonic diesters (A) of the general formula II:

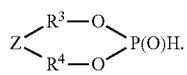
(II)

In the general formula II the radicals $R^3$ and $R^4$ are identical or different from one another; preferably they are identical.

The radicals $R^3$ and $R^4$ are selected from the group consisting of:
- substituted and unsubstituted, divalent alkyl- having 1 to 20, preferably 1 to 10, and in particular 1 to 6 carbon atoms, cycloalkyl- having 3 to 20, preferably 3 to 10, and in particular 3 to 6 carbon atoms, and aryl- having 5 to 20, preferably 6 to 14, and in particular 6 to 10 carbon atoms, the hyphen symbolizing in each case the covalent bond between a carbon atom of the radical $R^3$ or $R^4$ and the oxygen atom of the O—P group;
- substituted and unsubstituted, divalent alkylaryl-, arylalkyl-, alkylcycloalkyl-, cycloalkylalkyl-, arylcycloalkyl-, cycloalkylaryl-, alkylcycloalkylaryl-, alkylarylcycloalkyl-, arylcycloalkylalkyl-, arylalkylcycloalkyl-, cycloalkylalkylaryl-, and cycloalkylarylalkyl-, the alkyl, cycloalkyl-, and aryl groups therein each containing the above-recited number of carbon atoms and the hyphen symbolizing in each case the covalent bond between a carbon atom of the radical $R^3$ and $R^4$ and the oxygen atom of the O—P group; and
- substituted and unsubstituted, divalent radical- of the above-recited kind, containing at least one, in particular one heteroatom selected from the group consisting of oxygen atom, sulfur atom, nitrogen atom, phosphorus atom, and silicon atom, the hyphen symbolizing the covalent bond between a carbon atom of the radical and the oxygen atom of the O—P group;

In the general formula II the variable Z is
- a covalent bond between an atom of the radical $R^3$ and an atom of the radical $R^4$;
- a divalent linking group selected from the group consisting of oxygen atom, substituted, especially oxygen-substituted, and unsubstituted sulfur atom, substituted, especially alkyl-substituted nitrogen atom, substituted, especially oxygen-substituted phosphorus atom, and substituted, especially alkyl- and alkoxy-substituted silicon atom, especially oxygen atom; or
- a divalent linking group selected from the group consisting of substituted and unsubstituted alkyl having 1 to 10, preferably 1 to 6, and in particular 1 to 4 carbon atoms, cycloalkyl having 3 to 10, preferably 3 to 6, and in particular 6 carbon atoms, and aryl having 5 to 10, and in particular 6 carbon atoms, said alkyl, cycloalkyl, and aryl being free from heteroatoms or containing at least one heteroatom selected from the group consisting of oxygen atom, sulfur atom, nitrogen atom, phosphorus atom, and silicon atom, especially oxygen atom, sulfur atom, and nitrogen atom.

Preferably the acyclic diphosphonic diesters (A) are selected from the group consisting of the acyclic diphosphonic diesters (A) of the general formula III:

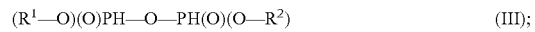
(III);

in which the variables are as defined above.

Preferably the cyclic diphosphonic diesters (A) are selected from the group consisting of the cyclic diphosphonic diesters (A) of the general formula IV:

(IV)

in which the variables are as defined above.

Suitable substituents for the radicals $R^1$, $R^2$, $R^3$, and $R^4$ include all groups and atoms which do not adversely affect the action of the phosphonic diesters and of the diphosphonic diesters (A), do not inhibit the curing reactions in the mixtures of the invention, do not lead to unwanted side reactions, and induce no toxic action. Examples of suitable substituents are halogen atoms, nitrile groups or nitro groups, preferably halogen atoms, especially fluorine atoms, chlorine atoms and bromine atoms.

Preferably the radicals $R^1$, $R^2$, $R^3$, and $R^4$ are unsubstituted.

Preferably the radicals $R^1$ and $R^2$ are selected from the group consisting of phenyl, methyl, and ethyl. More preferably phenyl is used.

Preferably the acyclic phosphonic diesters (A) of the general formula I are used.

More preferably the radicals $R^1$ and $R^2$ of the acyclic phosphonic diesters (A) of the general formula I are selected from the group consisting of phenyl, methyl, and ethyl. Phenyl in particular is used.

An example of an especially suitable phosphonic diester (A) of the general formula I is diphenyl phosphonate, which is sometimes also referred to by those in the art (not entirely correctly) as diphenyl phosphite.

For the purposes of the inventive use the compounds (B) are present alone alongside the phosphonic diesters and/or diphosphonic diesters (A). Preferably they are present in the mixtures of the invention alongside further constituents.

The compounds (B) are selected from the group consisting of low molecular weight, oligomeric, and polymeric compounds.

As is known, oligomeric compounds are understood to be compounds composed of 3 to 12 low molecular weight structural units.

As is known, polymeric compounds are understood to be compounds composed of more than 8 low molecular weight structural units.

Whether a person of skill in the art regards a compound composed of 8 to 12 low molecular weight structural units as an oligomer or polymer depends primarily on the molecular weight of the compound in question.

For the purposes of the mixtures of the invention the low molecular weight oligomeric compounds (B) are also referred to by those in the art, in particular, as crosslinking agents, and the polymeric compounds (B) as binders.

The compounds (B) contain at least two, preferably at least three, and in particular at least four reactive functional groups which can be used in the context of the inventive use for the transesterification, transamidation, self-condensation of N-hydroxyalkylamino groups and/or N-alkoxyalkylamino groups, transacetalization of N-alkoxyalkylamino groups and/or acetalization of N-hydroxyalkylamino groups.

The reactive functional groups of the compounds (B) are preferably selected from the group consisting of hydroxyl groups, thiol groups, primary amino groups, secondary amino groups, N-hydroxyalkylamino groups, and N-alkoxyalkylamino groups, especially hydroxyl groups, N-hydroxyalkylamino groups, and N-alkoxyalkylamino groups.

The N-hydroxyalkylamino groups of the compounds (B) are preferably N-hydroxymethyl-amino groups.

The N-alkoxyalkylamino groups of the compounds (B) are preferably N-methoxymethyl-amino groups.

The compounds (B) containing the above-described N-hydroxyalkylamino groups, especially the N-hydroxymethylamino groups, and/or the N-alkoxyalkylamino groups, especially the N-methoxymethylamino groups, are preferably amino resins (B) such as are known in detail from, for example, Bodo Müller/Ulrich Poth, »Lackformulierung und Lackrezeptur—Das Lehrbuch für Ausbildung und Praxis«, ed. Dr. Ulrich Zorll, Vincentz Verlag, Hannover, 2003, »2.2 Einbrennlacke auf Basis von Aminoharzen«, pages 124 to 143, and »4.2 Wässrige Einbrennlacke auf Basis von Aminoharzen«, pages 206 to 215, Z. W. Wicks Jr., F. Jones and S. P. Pappas, »Organic Coatings—Science and Technology«, $2^{nd}$ edition, 1999, Wiley-Interscience, New York, Weinheim, »Chapter 9 —Amino Resins«, pages 162 to 179, or Johan Bieleman, »Lackadditive«, Wiley-VCH, Weinheim, New York, 1998, »7.2.2 Melaminharzvernetzende Systeme«, pages 242 to 250.

The compounds (B) containing hydroxyl groups, thiol groups, primary amino groups and/or secondary amino groups, but especially hydroxyl groups, are preferably selected from the group consisting of addition resins and condensation resins and also (co)polymers of olefinically unsaturated monomers. Preferably they are binders (B) such as are typically used in thermally curable mixtures.

Use is made in particular of the hydroxyl-containing binders (B) such as are typically employed in thermally curable mixtures in combination with amino resins (B) and/or in combination with the polyisocyanates (C) described below.

Examples of suitable binders (B) for use in combination with amino resins (B) and/or polyisocyanates (C) are known for example from Bodo Müller/Ulrich Poth, »Lackformulierung und Lackrezeptur—Das Lehrbuch fur Ausbildung und Praxis«, ed. Dr. Ulrich Zorll, Vincentz Verlag, Hannover, 2003, »2.2.3 Kombinationspartner für Aminoharze«, pages 130 to 133, »4.2 Wässrige Einbrennlacke auf Basis von Aminoharzen«, pages 206 to 215, and »1.3.1.3 OH-Gruppen-haltige Bindemittel für 2K-PUR-Lacke«, pages 104 to 106.

Surprisingly it is possible, in a given mixture of the invention, for the reactions of the phosphonic diesters and the diphosphonic diesters (A) with the compounds (B), and the transesterifications, transamidations, self-condensations of N-hydroxyalkylamino groups and/or N-alkoxyalkylamino groups, transacetalizations of N-alkoxyalkylamino groups and/or acetalizations of N-hydroxyalkylamino groups of the compounds (B), to proceed on their own. It is also possible, surprisingly, for the reactions and the catalysis in question to proceed simultaneously alongside one another or successively after one another.

Even more surprising is the fact that the reactions and/or the catalysis proceed without problems even in the presence of compounds (C) which contain at least one free isocyanate group and preferably at least two free isocyanate groups and in particular at least three free isocyanate groups.

Examples of suitable compounds (C) are monoisocyanates (C), such as ethyl, propyl, butyl, pentyl, hexyl, heptyl, octyl, nonyl, decyl, undecyl, lauryl, cyclohexyl or phenyl isocyanate;

diisocyanates (C), such as tetramethylene 1,4-diisocyanate, hexamethylene 1,6-diisocyanate, 2,2,4-trimethylhexamethylene 1,6-diisocyanate, omega,omega'-dipropyl ether diisocyanate, cyclohexyl 1,4-diisocyanate, cyclohexyl 1,3-diisocyanate, cyclohexyl 1,2-diisocyanate, dicyclohexylmethane 4,4'-diisocyanate, 1,5-dimethyl-2,4-di(isocyanatomethyl)benzene, 1,5-dimethyl-2,4-di(isocyanatoethyl)benzene, 1,3,5-trimethyl-2,4-di(isocyanatomethyl)benzene, 1,3,5-triethyl-2,4-di(isocyanatomethyl)benzene, isophorone diisocyanate, dicyclohexyldimethylmethane 4,4'-diisocyanate, 2,4-tolylene diisocyanate, 2,6-tolylene diisocyanate, and diphenylmethane 4,4'-diisocyanate; and polyisocyanates (C), such as triisocyanates such as nonane triisocyanate (NTI) and also polyisocyanates (C) based on the above-described diisocyanates and triisocyanates (C), especially oligomers containing isocyanurate, biuret, allophanate, iminooxadiazinedione, urethane, carbodiimide, urea and/or uretdione groups, known for example from the patents and patent applications CA 2,163,591 A 1, U.S. Pat. Nos. 4,419,513 A, 4,454,317 A, EP 0 646 608 A 1, U.S. Pat. No. 4,801,675 A, EP 0 183 976 A 1, DE 40 15 155 A 1, EP 0 303 150 A 1, EP 0 496 208A 1, EP 0 524 500A 1, EP 0 566 037A 1, U.S. Pat. Nos. 5,258,482A, 5,290,902 A, EP 0 649 806 A 1, DE 42 29 183 A 1 or EP 0 531 820 A 1 and having advantageously an NCO functionality of 2.0-5.0, preferably of 2.2-4.0, in particular of 2.5-3.8;

the high-viscosity polyisocyanates (C) of the kind described in German patent application DE 198 28 935 A 1; and also the polyisocyanates (C) known from German patent application DE 199 24 170 A 1, column 2, lines 6 to 34, column 4, line 16, to column 6, line 62, the polyisocyanates (C) known from international patent applications WO00/31194, page 11, line 30, to page 12, line26, and WO00/37520, page5, line 4, to page 6, line 27, and the polyisocyanates (C) known from European patent application EP 0 976 723 A2, page 12, paragraph [0128], to page 22, paragraph [0284].

It is a particular advantage of the inventive use that the proportions of compounds (B), especially amino resins (B), to compounds (C) can be varied very widely, so that the physical composition of the mixtures of the invention as well can be varied very widely and tailored to the requirements of the respective end use. The proportions (B):(C) are preferably 0.01 to 100, more preferably 0.1 to 50, and in particular 1 to 10.

A further particular advantage of the inventive use is that the phosphonic diesters and/or diphosphonic diesters (A) develop their outstanding activities even in comparatively small amounts. They are preferably used in an amount of 0.1% to 20%, more preferably 0.5% to 15%, and in particular 1% to 10% by weight based in each case on the specific mixture of the invention that is present.

The mixture of the invention necessarily comprises at least one, especially one, of the above-described phosphonic diesters and/or diphosphonic diesters (A) and at least one of the above-described compounds (B).

The mixture of the invention may further comprise at least one polyisocyanate (C).

The mixture of the invention may not least further comprise at least one additive (D) in effective amounts. The additive (D) is preferably selected from the group consisting of crosslinking agents different than the compounds (B) and (C), compounds which can be activated with actinic radiation, especially UV radiation, reactive and inert organic solvents, organic and inorganic, colored and achromatic, optical effect, electrically conductive, magnetically shielding, and fluorescent pigments, transparent and opaque, organic and inorganic fillers, nanoparticles, UV absorbers, light stabilizers, free-radical scavengers, photoinitiators, free-radical polymerization initiators, driers, devolatilizers, slip additives, polymerization inhibitors, defoamers, emulsifiers and wetting agents, adhesion promoters, flow control agents, film-forming assistants, rheology control additives, and flame retardants.

The mixture of the invention comprises the above-described constituents (B) to (D) in the customary, known amounts, such as are known, for example, from European patent EP 1 171 356 B1 or from international patent applications WO 01/09261, WO 01/09260, WO 01/09259 or WO 01/09231, or from the textbook by Bodo Müller and Ulrich Poth, »Lackformulierung und Lackrezeptur—Das Lehrbuch für Ausbildung und Praxis«, ed. Dr. Ulrich Zorll, Vincentz Verlag, Hanover, 2003, »2.2 Einbrennlacke auf Basis von Aminoharzen«, pages 124 to 143, »4.2 Wässrige Einbrennlacke auf Basis von Aminoharzen«, pages 206 to 215, »1.3.1 Zwei-Komponenten-Systeme (2 K)«, pages 98 to 111, »3.2 Wässrige Zwei-Komponenten-Systeme (2K)«, pages 192 to 197, and »Teil IV Lösemittelfreie Lacke—1.1 2K-Polyurethan-Beschichtungen«, pages 231 to 233.

The mixtures of the invention may be in any of a very wide variety of physical states and three-dimensional forms.

Thus the mixtures of the invention may at room temperature be solid or liquid or fluid. Alternatively they may be solid at room temperature and fluid at higher temperatures, exhibiting preferably thermoplastic behavior. In particular they may be conventional mixtures comprising organic solvents, aqueous mixtures, substantially or entirely solvent- and water-free liquid mixtures (100% systems), substantially or entirely solvent- and water-free solid powders, or substantially or entirely solvent-free powder suspensions (powder slurries).

They may also be one-component systems, in which all of the constituents are present alongside one another in one component.

They are preferably two-component or multicomponent systems, especially two-component systems, in which the polyisocyanates (C) are present in a separate component (II) until shortly before the preparation and application of the mixture of the invention in question, separated from the other constituents, particular the constituents (B). These other constituents are preferably present in at least one, especially one, component (I).

It is a very particular advantage of the inventive use, of the mixture of the invention, and of the process of the invention, in this context, that the phosphonic diesters and/or diphosphonic diesters (A) may also be present, and preferably are present, in the component (II), comprising the polyisocyanates (C), of the two-component or multicomponent systems of the invention.

In terms of method the preparation of the mixtures of the invention has no peculiarities but instead takes place according to the method of the invention by the mixing and homogenizing of the above-described constituents, by means of customary, known mixing methods and apparatus such as stirred tanks, agitator mills, extruders, compounders, Ultraturrax devices, inline dissolvers, static mixers, micromixers, toothed-wheel dispersers, pressure release nozzles and/or microfluidizers, in the absence of actinic radiation where appropriate. The selection of the optimum method for any given individual case is guided in particular by the physical state and three-dimensional form which the mixture of the invention is to have. Where, for example, a thermoplastic mixture of the invention is to take the form of a sheet or a laminate, extrusion through a slot die is particularly appropriate for the preparation of the mixture of the invention and for its shaping.

The resultant mixtures of the invention are used preferably to produce new cured materials, especially new thermoset materials, which serve any of a very wide variety of end uses and are referred to below as "materials of the invention".

The mixtures of the invention are preferably starting products for moldings and sheets or else are coating materials, adhesives or sealants, especially coating materials.

The materials of the invention are preferably new moldings, sheets, coatings, adhesive layers, and seals, especially new coatings.

In particular the coating materials of the invention are used as new priming materials, electrocoat materials, surfacers, antistonechip primers, solid-color topcoat materials, basecoat, especially aqueous basecoat, materials and/or clearcoat materials, to produce primer coatings, electrocoats, surfacer coats, prime coats, basecoats, solid-color topcoats and/or clearcoats.

In particular they are used as clearcoat materials to produce new multicoat color and/or effect, electrically conductive, magnetically shielding or fluorescent paint systems, especially multicoat color and/or effect paint systems. For producing the multicoat paint systems of the invention it is possible to employ the customary, known wet-on-wet techniques and/or extrusion techniques, and also the customary, known paint or sheet constructions.

The materials of the invention are produced by applying the mixtures of the invention to customary, known temporary or permanent substrates.

The sheets and moldings of the invention are preferably produced using customary, known temporary substrates, such as metal and plastic belts and sheets or hollow bodies of metal, glass, plastic, wood or ceramic, which are easily removable without damaging the sheets and moldings of the invention produced from the mixtures of the invention.

Where the mixtures of the invention are used to produce the coatings, adhesive layers, and seals of the invention, permanent substrates are employed, such as bodies of means of transport, especially motor vehicle bodies, and parts thereof, the interior and exterior of buildings and parts thereof, doors, windows, furniture, hollow glassware, coils, containers, packaging, small parts, optical, mechanical, and electrical components, and components of white goods. The sheets and moldings of the invention may likewise serve as permanent substrates.

In terms of method the application of the mixtures of the invention has no peculiarities but may instead take place by all customary, known application methods suitable for the mixture of the invention in question, such as extrusion, electrocoating, injecting, spraying, including powder spraying, knifecoating, spreading, pouring, dipping, trickling or rolling, for example. Preference is given to employing extrusion application methods and spray application methods, particularly spray application methods.

Following their application the mixtures of the invention are subjected to customary, known thermal curing.

The thermal cure takes place in general after a certain rest time or flashoff time. This may have a duration of 30 s to 2 h, preferably 1 min to 1 h and in particular 1 to 45 min. The rest time serves, for example, for the flow and devolatilization of films of the mixtures of the invention, and for the evaporation of volatile constituents such as any solvent and/or water present. Flashing off can be accelerated by an elevated temperature, but below that sufficient for curing, and/or by a reduced atmospheric humidity.

This process measure is also employed for drying the applied mixtures of the invention, particularly the films of the coating materials of the invention, especially the films of the paint coats of the invention which are not to be cured or are to be only part-cured.

The thermal cure is accomplished, for example, with the aid of a gaseous, liquid and/or solid hot medium, such as hot air, heated oil or heated rolls, or microwave radiation infrared light and/or near infrared (NIR) light. Heating preferably is accomplished in a forced-air oven or by exposure to IR and/or NIR lamps. Curing may also take place in stages. The thermal cure is accomplished preferably at temperatures from room temperature to 200° C., more preferably from room temperature to 180° C., and in particular from room temperature to 160° C.

The thermal cure may additionally be assisted by physical curing, in which case filming occurs by release of solvent from the mixtures of the invention, with linking within the resultant materials of the invention taking place via looping of the polymer molecules of the binders (regarding the term, cf. Römpp Lexikon Lacke und Druckfarben, Georg Thieme Verlag, Stuttgart, N.Y., 1998, 141 Binders«, pages 73 and 74). Or else filming takes place via the coalescence of binder particles (cf. Römpp Lexikon Lacke und Druckfarben, Georg Thieme Verlag, Stuttgart, N.Y., 1998, »Curing«, pages 274 and 275).

The resultant materials of the invention, especially the resultant sheets, moldings, coatings, adhesive layers, and seals of the invention, are outstandingly suitable for the coating, adhesive bonding, sealing, wrapping, and packaging of bodies of means of transport, especially motor vehicle bodies, and parts thereof, the interior and exterior of buildings and parts thereof, doors, windows, furniture, hollow glassware, coils, containers, packaging, small parts, such as nuts, bolts, wheel rims or hub caps, optical components, mechanical components, electrical components, such as windings (coils, stators, rotors), and also components for white goods, such as radiators, household appliances, refrigerator casings or washing-machine casings.

The mixtures of the invention afford very particular advantages when used as clearcoat materials of the invention to produce new clearcoats.

The clearcoats of the invention are usually the outermost coats of multicoat paint systems or sheets or laminates, which substantially determine the overall appearance and protect the substrates and/or the color and/or effect coats of multicoat paint systems or sheets or laminates against mechanical and chemical damage and against radiation-induced damage. Consequently, deficiencies in hardness, scratch resistance, chemical stability, and yellowing stability in the clearcoat are manifested to a particularly severe extent. The clearcoats of the invention produced, however, exhibit little yellowing. They are highly scratch-resistant, and after scratching exhibit only very low losses of gloss. In particular the loss of gloss in the Amtec/Kistler carwash simulation test is very low. At the same time they have a high hardness and a particularly high chemical resistance. Not least they exhibit outstanding substrate adhesion and intercoat adhesion.

EXAMPLES

Example 1

The Production of Two-Component System 1 and of Clearcoat Material 1

First of all, two-component system 1 was produced by mixing the respective constituents of components (I) and (II) in the stated amounts and homogenizing the resultant mixtures.

Component (I):
- 41.15 parts by weight of a hydroxyl-containing polyester (Desmophen® A 870 from Bayer A G, 70 percent in butyl acetate),
- 11.21 parts by weight of an amino resin (Cymel® 202 from Cytec), 5.33 parts by weight of a first light stabilizer (Tinuvin® 292 from Ciba Specialty Chemicals, 10 percent in butyl acetate), 10.67 parts by weight of a second light stabilizer (Tinuvin® 1130 from Ciba Specialty Chemicals, 10 percent in butyl acetate), 10.02 parts by weight of methoxypropyl acetate (MPA)/Solvesso® 100 (1:1) and 2.13 parts by weight of butyl glycol acetate.

Component (II):

19.49 parts by weight of polyisocyanate (Basonat® HI100 from BASF Aktiengesellschaft, 90 percent in Solventnaphtha®) and 3 parts by weight of diphenyl phosphonate.

Clearcoat material 1 was produced by mixing components (I) and (II) and homogenizing the resultant mixture. It had a pot life of more than 6 hours.

Example 2

The Production of Clearcoat 1

Clearcoat 1 was produced using steel panels (Bonder® 26S60) which had been coated with a cathodically deposited and thermally cured electrocoat and with a thermally cured surfacer coat.

Over the surfacer coat the commercial black aqueous basecoat material Brillantschwarz from BASF Coatings AG was applied. The resulting aqueous basecoat film was dried at 80° C. for 10 minutes. Thereafter clearcoat material 1 from example 1 was applied, after which the aqueous basecoat film and the clearcoat film 1 were cured jointly at 140° C. for 22 minutes. This gave a basecoat with a film thickness of 10 µm and clearcoat 1 with a film thickness of 40 µm.

Clearcoat 1 was completely clear, free from paint defects, such as blisters, bits or craters, bright and of high gloss, free from yellowing, hard, flexible, scratch-resistant, chemically stable, etch-resistant, and abrasion-resistant. It was therefore outstandingly suitable as a clearcoat as part of multicoat color and effect paint systems for top-class automobiles.

In parallel with this the course of the crosslinking of clearcoat material 1 was monitored by IR spectroscopy on an ATR crystal for 25 minutes on the basis of the shift in the frequency of the melamine band (1500 to 1550 cm$^{-1}$) and the decrease in the isocyanate band (2250 to 2300 cm$^{-1}$). The IR spectra underscored the fact that in the presence of diphenyl phosphonate both the amino resin and the polyisocyanate were incorporated into the three-dimensional network. It was apparent, moreover, that the —O—PH—O— structural units formed by the transesterification of diphenyl phosphonate were also incorporated into the three-dimensional network.

Example C1 (Comparative)

The Production of Two-Component System C1

Example 1 was repeated but using, instead of 3 parts by weight of diphenyl phosphonate, 6 parts by weight of the commercial acidic phosphoric ester Cycat® 296-9 from Cytec Industries, as a 50 percent solution in butanol.

It was found that the acidic phosphoric ester was not compatible with component II and that, instead, evolution of heat was accompanied by unwanted reactions which led to the extensive unusability of component II.

Example C2 (Comparative)

The Production of Two-Component System C2, Clearcoat Material C2, and Clearcoat C2

To produce two-component system C2, example C1 was repeated but adding the solution of the acidic phosphoric ester to component I.

The stability in storage of the component I in question was significantly lower than that of component I of example 1 or of example C1.

In the course of the production of clearcoat material C2, evolution of heat was accompanied by premature, unwanted reactions which led to turbidities and bits.

The course of the crosslinking of clearcoat material C2 was monitored by IR spectroscopy on an ATR crystal for 25 minutes on the basis of the shift in the frequency of the melamine band (1500 to 1550 cm$^{-1}$) and the decrease in the isocyanate band (2250 to 2300 cm$^{-1}$). The IR spectra underscored the fact that, although the amino resin underwent crosslinking, the crosslinking of the polyisocyanate was severely adversely affected.

What is claimed is:

1. A thermally curable, liquid mixture, comprising:
   compounds (A) in an amount of 0.1 to 20 wt. %, wherein (A) comprises: at least one phosphonic diester (A), at least one diphosphonic diester (A), or at least one phosphonic diester and at least one diphosphonic diester (A);
   at least one first compound (B) comprising at least two reactive functional groups comprising hydroxyl groups, which is selected from the group consisting of addition resins, condensation resins, and (co)polymers of olefinically unsaturated monomers; and
   at least one second compound (B) comprising N-hydroxyalkylamino groups, N-alkoxyalkylamino groups, or a combination thereof, which is an amino resin and can be reacted by transesterification, transamidation, self-condensation of N-hydroxyalkylamino groups, self-condensation of N-alkoxyalkylamino groups, transacetalization of N-alkoxyalkylamino groups, acetalization of N-hydroxyalkylamino groups, or a combination thereof; and
   at least one polyisocyanate (C) comprising at least two free isocyanate groups;
   wherein the thermally curable, liquid mixture is a two-component or multi-component coating system, the two-component or multi-component coating system comprising the at least one first compound (B) comprising at least two reactive functional groups as a separate component (I) and the at least one polyisocyanate (C) as a separate component (II);
   wherein a proportion of (B):(C) is in the range of 0.01 to 100, wherein (B) includes the total of the at least one first compound (B) comprising at least two reactive functional groups and the at least one second compound (B) comprising N-hydroxyalkylamino groups, N-alkoxyalkylamino groups, or a combination thereof; and
   wherein the two-component or multi-component coating system is substantially water-free.

2. The thermally curable, liquid mixture of claim 1, wherein the at least one phosphonic diester (A) is selected from the group consisting of acyclic phosphonic diesters and cyclic phosphonic diesters, and wherein the at least one diphosphonic diester (A) is selected from the group consisting of acyclic diphosphonic diesters and cyclic diphosphonic diesters.

3. The thermally curable, liquid mixture of claim 2, comprising at least one acyclic phosphonic diester having the general formula I:

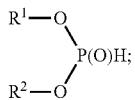

(I)

wherein $R^1$ and $R^2$ are identical or different from one another and are selected from the group consisting of:
substituted and unsubstituted alkyl- having 1 to 20 carbon atoms, cycloalkyl- having 3 to 20 carbon atoms, and aryl- having 5 to 20 carbon atoms, the hyphen symbolizing in each case the covalent bond between a carbon atom of the radical $R^1$ or $R^2$ and the oxygen atom of the O—P group;
substituted and unsubstituted alkylaryl-, arylalkyl-, alkylcycloalkyl-, cycloalkylalkyl-, arylcycloalkyl-, cycloalkylaryl-, alkylcycloalkylaryl-, alkylarylcycloalkyl-, arylcycloalkylalkyl-, arylalkylcycloalkyl-, cycloalkylalkylaryl-, and cycloalkylarylalkyl-, the alkyl, cycloalkyl-, and aryl groups therein each containing the above-recited number of carbon atoms and the hyphen symbolizing in each case the covalent bond between a carbon atom of the radical $R^1$ and $R^2$ and the oxygen atom of the O—P group; and
substituted and unsubstituted radical- of the above-recited kind, containing at least one heteroatom selected from the group consisting of oxygen atom, sulfur atom, nitrogen atom, phosphorus atom, and silicon atom, the hyphen symbolizing the covalent bond between a carbon atom of the radical and the oxygen atom of the O—P group.

4. The thermally curable, liquid mixture of claim 1, further comprising at least one additive (D).

5. A cured material, comprising the product of thermally curing a mixture according to claim 1.

6. The cured material of claim 5, comprising moldings, sheets, coatings, adhesive layers, seals, or a combination thereof.

7. The thermally curable, liquid mixture of claim 3, wherein $R^1$ and $R^2$ are identical or different from one another and are selected from the group consisting of phenyl, methyl, and ethyl.

8. The thermally curable, liquid mixture of claim 7, wherein $R^1$ and $R^2$ are phenyl.

9. The thermally curable, liquid mixture of claim 1, wherein at least one additive (D) is present as the separate component (II).

10. The thermally curable, liquid mixture of claim 4, wherein the at least one phosphonic diester (A), at least one diphosphonic diester (A), or at least one phosphonic diester and at least one diphosphonic diester (A) is present in component (II).

11. The thermally curable, liquid mixture of claim 1, wherein the at least one first compound (B) is a (co)polymer of olefinically unsaturated monomers.

12. The thermally curable, liquid mixture of claim 1, wherein the at least one phosphonic diester (A), at least one diphosphonic diester (A), or at least one phosphonic diester and at least one diphosphonic diester (A) is present in component (I).

13. A process for preparing a thermally curable, liquid mixture, comprising:
mixing:
compounds (A) in an amount of 0.1 to 20 wt. %, wherein (A) comprises: at least one phosphonic diester (A), at least one diphosphonic diester (A), or at least one phosphonic diester and at least one diphosphonic diester (A),
at least one first compound (B) comprising at least two reactive functional groups comprising hydroxyl groups, which is selected from the group consisting of addition resins, condensation resins, and (co)polymers of olefinically unsaturated monomers; and
at least one second compound (B) comprising N-hydroxyalkyamino groups, N-alkoxyalkylamino groups, or a combination thereof, which is an amino resin and can be reacted by transesterification, transamidation, self-condensation of N-hydroxyalkylamino groups, self-condensation of N-alkoxyalkylamino groups, transacetalization of N-alkoxyalkylamino groups, acetalization of N-hydroxyalkylamino groups, or a combination thereof; and
at least one polyisocyanate (C) comprising at least two free isocyanate groups; and
homogenizing the resultant mixture,
wherein the thermally curable, liquid mixture is a two-component or multi-component coating system, the two-component or multi-component coating system comprising the at least one first compound (B) comprising at least two reactive functional groups as a separate component (I) and the at least one polyisocyanate (C) as a separate component (II);
wherein a proportion of (B):(C) is in the range of 0.01 to 100, wherein (B) includes the total of the at least one first compound (B) comprising at least two reactive functional groups and the at least one second compound (B) comprising N-hydroxyalkylamino groups, N-alkoxyalkylamino groups, or a combination thereof; and
wherein the two-component or multi-component coating system is substantially water-free.

14. The thermally curable, liquid mixture of claim 3, wherein at least one acyclic phosphonic diester having the general formula I and $R^1$ and $R^2$ are identical or different from one another are selected from the group consisting of substituted and unsubstituted alkyl- having 1 to 20 carbon atoms, cycloalkyl- having 3 to 20 carbon atoms, and aryl- having 5 to 20 carbon atoms, the hyphen symbolizing in each case the covalent bond between a carbon atom of the radical $R^1$ or $R^2$ and the oxygen atom of the O—P group.

15. The process of claim 13, further comprising mixing at least one additive (D).

16. The process of claim 13, further comprising:
mixing the at least one polyisocyanate (C), and optionally, at least one additive (D) to form the separate component (II);
mixing the separate component (II) with the mixture of the other components; and
homogenizing the resultant mixture.

17. The process of claim 16 wherein the at least one phosphonic diester (A), at least one diphosphonic diester (A), or at least one phosphonic diester and at least one diphosphonic diester (A) is present in component (II).

18. The process of claim 13, further comprising thermally curing the resultant mixture.

19. The process for preparing a thermally curable, liquid mixture of claim 13, wherein the at least one first compound (B) is a (co)polymer of olefinically unsaturated monomers.

20. The process for preparing a thermally curable, liquid mixture of claim 13, wherein the at least one phosphonic diester (A), at least one diphosphonic diester (A), or at least one phosphonic diester and at least one diphosphonic diester (A) is present in component (I).

21. The process for preparing a thermally curable, liquid mixture of claim 13, wherein at least one acyclic phosphonic diester having the general formula I and $R^1$ and $R^2$ are identical or different from one another are selected from the group consisting of substituted and unsubstituted alkyl- having 1 to 20 carbon atoms, cycloalkyl- having 3 to 20 carbon atoms, and aryl- having 5 to 20 carbon atoms, the hyphen symbolizing in each case the covalent bond between a carbon atom of the radical $R^1$ or $R^2$ and the oxygen atom of the O—P group.

22. A thermally curable mixture, comprising:
compounds (A) in an amount of 0.1 to 20 wt. %, wherein (A) comprises: at least one phosphonic diester (A), at least one diphosphonic diester (A), or at least one phosphonic diester and at least one diphosphonic diester (A);
at least one first compound (B) comprising hydroxyl groups, which is selected from the group consisting of addition resins, condensation resins, and (co)polymers of olefinically unsaturated monomers; and at least one second compound (B) comprising N-hydroxyalkylamino groups, N-alkoxyalkylamino groups, or a combination thereof, which is an amino resin and can be reacted by transesterification, transamidation, self-condensation of N-hydroxyalkylamino groups, self-condensation of N-alkoxyalkylamino groups, transacetalization of N-alkoxyalkylamino groups, acetalization of N-hydroxyalkylamino groups, or a combination thereof; and
at least one polyisocyanate (C) comprising at least two free isocyanate groups;
wherein the at least one phosphonic diester is a cyclic phosphonic diester having the general formula II:

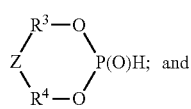

(II)

the at least one diphosphonic diester is an acyclic diphosphonic diester having the general formula III:

(R¹—O)(O)PH—O—PH(O)(O—R²)  (III); or a cyclic diphosphonic diester having the general formula IV:

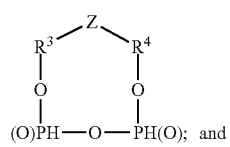

(IV)

wherein $R^1$ and $R^2$ are identical or different from one another and are selected from the group consisting of: substituted and unsubstituted alkyl- having 1 to 20 carbon atoms, cycloalkyl- having 3 to 20 carbon atoms, and aryl- having 5 to 20 carbon atoms, the hyphen symbolizing in each case the covalent bond between a carbon atom of the radical $R^1$ or $R^2$ and the oxygen atom of the O—P group;
substituted and unsubstituted alkylaryl-, arylalkyl-, alkylcycloalkyl-, cycloalkylalkyl-, arylcycloalkyl-, cycloalkylaryl-, alkylcycloalkylaryl-, alkylarylcycloalkyl-, arylcycloalkylalkyl-, arylalkylcycloalkyl-, cycloalkylalkylaryl-, and cycloalkylarylalkyl-, the alkyl, cycloalkyl-, and aryl groups therein each containing the above-recited number of carbon atoms and the hyphen symbolizing in each case the covalent bond between a carbon atom of the radical $R^1$ and $R^2$ and the oxygen atom of the O—P group; and
substituted and unsubstituted radical- of the above-recited kind, containing at least one heteroatom selected from the group consisting of oxygen atom, sulfur atom, nitrogen atom, phosphorus atom, and silicon atom, the hyphen symbolizing the covalent bond between a carbon atom of the radical and the oxygen atom of the O—P group; and
wherein $R^3$ and $R^4$ are identical or different from one another and are selected from the group consisting of:
substituted and unsubstituted, divalent alkyl- having 1 to 20 carbon atoms, cycloalkyl having 3 to 20 carbon atoms, and aryl- having 5 to 20 carbon atoms, the hyphen symbolizing in each case the covalent bond between a carbon atom of the radical $R^3$ or $R^4$ and the oxygen atom of the O—P group;
substituted and unsubstituted, divalent alkylaryl-, arylalkyl-, alkylcycloalkyl-, cycloalkylalkyl-, arylcycloalkyl-, cycloalkylaryl-, alkylcycloalkylaryl-, alkylarylcycloalkyl-, arylcycloalkylalkyl-, arylalkylcycloalkyl-, cycloalkylalkylaryl-, and cycloalkylarylalkyl-, the alkyl, cycloalkyl-, and aryl groups therein each containing the above-recited number of carbon atoms and the hyphen symbolizing in each case the covalent bond between a carbon atom of the radical $R^3$ and $R^4$ and the oxygen atom of the O—P group; and
substituted and unsubstituted, divalent radical- of the above-recited kind, containing at least one heteroatom selected from the group consisting of oxygen atom, sulfur atom, nitrogen atom, phosphorus atom, and silicon atom, the hyphen symbolizing the covalent bond between a carbon atom of the radical and the oxygen atom of the O—P group; and
wherein Z is a covalent bond between an atom of the radical $R^3$ and an atom of the radical $R^4$ or is a divalent linking group selected from the group consisting of oxygen atom, substituted and unsubstituted sulfur atom, substituted nitrogen atom, substituted phosphorus atom, substituted silicon atom, substituted and unsubstituted alkyl having 1 to 10 carbon atoms, cycloalkyl having 3 to 10 carbon atoms, and aryl having 5 to 10 carbon atoms, said alkyl, cycloalkyl, and aryl being free from heteroatoms or containing at least one heteroatom selected from the group consisting of oxygen atom, sulfur atom, nitrogen atom, phosphorus atom, and silicon atom,
wherein the thermally curable, liquid mixture is a two-component or multi-component coating system, the two-component or multi-component coating system comprising the at least one compound (B) as a separate component (I) and the at least one polyisocyanate (C) as a separate component (II);

wherein a proportion of (B):(C) is in the range of 0.1:100 to 1:10, wherein (B) includes the total of the at least one first compound (B) comprising at least two reactive functional groups and the at least one second compound (B) comprising N-hydroxyalkylamino groups, N-alkoxyalkylamino groups, or a combination thereof; and wherein the two-component or multi-component coating system is substantially water-free.

23. The thermally curable mixture of claim 22, wherein $R^1$ and $R^2$ are identical or different from one another, and are selected from the group consisting of phenyl, methyl, and ethyl.

24. The thermally curable mixture of claim 23, wherein $R^1$ and $R^2$ are phenyl.

25. The thermally curable mixture of claim 22, wherein the at least one first compound (B) is a (co)polymer of olefinically unsaturated monomers.

26. The thermally curable mixture of claim 22, wherein the at least one phosphonic diester (A), at least one diphosphonic diester (A), or at least one phosphonic diester and at least one diphosphonic diester (A) is present in component (I).

27. The thermally curable mixture of claim 22, wherein the at least one phosphonic diester (A), at least one diphosphonic diester (A), or at least one phosphonic diester and at least one diphosphonic diester (A) is present in component (II).

28. A thermally curable, liquid mixture, comprising:

compound (A) in an amount of 0.1 to 20 wt. %, wherein compound (A) comprises: at least one acyclic phosphonic diester having the general formula I:

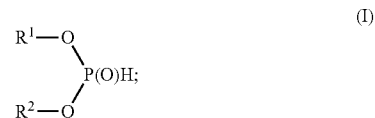

wherein $R^1$ and $R^2$ are identical or different from one another and are selected from the group consisting of:

substituted and unsubstituted alkyl- having 1 to 20 carbon atoms, cycloalkyl- having 3 to 20 carbon atoms, and aryl- having 5 to 20 carbon atoms, the hyphen symbolizing in each case the covalent bond between a carbon atom of the radical $R^1$ or $R^2$ and the oxygen atom of the O—P group;

at least one first compound (B) comprising a hydroxyl-functional (co)polymer of olefinically unsaturated monomers;

at least one second compound (B) comprising an amino resin;

at least one polyisocyanate (C) comprising at least two free isocyanate groups;

wherein the thermally curable, liquid mixture is a two-component or multi-component coating system, the two-component or multi-component coating system comprising the at least one first compound (B) as a separate component (I) and the at least one polyisocyanate (C) as a separate component (II);

a proportion of (B):(C) is in the range of 0.01 to 100, wherein (B) includes the total of the at least one first compound (B) and the at least one second compound (B);

the at least one acyclic phosphonic diester compound (A) is present in component (II); and the two-component or multi-component coating system is substantially water-free.

* * * * *